United States Patent Office 3,804,817
Patented Apr. 16, 1974

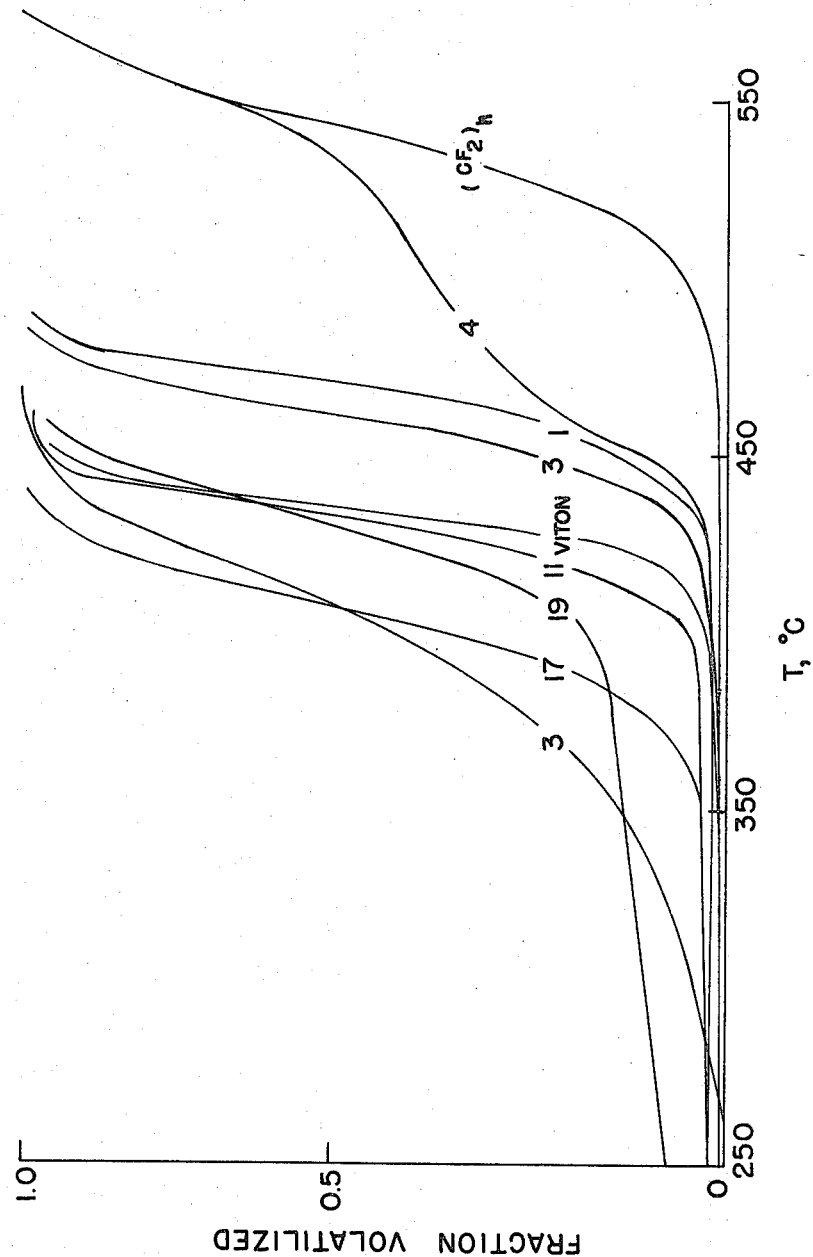

3,804,817
HIGHLY FLUORINATED POLYMERIC MATERIAL
Leo A. Wall, McLean, Va., and Daniel W. Brown, Bethesda, Md., assignors to the United States of America as represented by the Secretary of the Army
Continuation of abandoned application Ser. No. 58,506, July 27, 1970. This application Sept. 14, 1972, Ser. No. 289,019
Int. Cl. C08f 15/06
U.S. Cl. 260—87.5 A
1 Claim

ABSTRACT OF THE DISCLOSURE

Highly fluorinated polymeric materials characterized by improved solubility and stability are prepared by treatment of monomers with gamma rays at high pressure. Such materials, including poly-5,5,5,4,4,3,3-heptafluoropentene-1 and poly-4,4,4,3,3-pentafluorobutene-1 and copolymers thereof with tetrafluorethylene, exhibit unusually good physical properties and are tough, clear and film forming.

This is a continuation application of application Ser. No. 58,506, filed July 27, 1970, now abandoned.

The inveniton described herein may be manufactured, used, and licensed by or for the Government for governmental purposes without the payment to us of any royalty.

BACKGROUND OF THE INVENTION

Field of the invention

This invention relates to polymeric materials and particularly, to fluorinated polymeric materials exhibiting improved solubility in liquids. More particularly, the invention relates to soluble highly fluorinated polymeric materials characterized by improved stability.

Description of the prior art

Polymeric materials, rubbers, plastics, and coatings of high thermal oxidative, and photolytic stability exhibit great potential for varied and widespread application in modern technology.

At the present time the best polymers of this type in commercial production are highly fluorinated polymers based on the monomers—tetrafluoroethylene, hexafluoropropylene, chlorotrifluoroethylene, and 1,1-difluoroethylene. Prior art attempts to polymerize other highly fluorinated monomers to provide useful polymers and copolymers have in the main, not proven successful. Further, useful applications of the commercially available polymers, e.g., Teflon, Teflon 100, Viton, and Kynar have been limited as a result of attendant undesirable properties. "Teflon" is a Dupont trademark for tetrafluoroethylene fluorocarbon resins; "Teflon 100" is a Dupont trademark for fluorintaed ethylene-propylene resins; "Viton" is a Dupont trademark for fluoroelastomers having high temperature resistance and comprising copolymers of perfluoropropene and vinylidene fluoride "Kynar" is a Penn-salt trademark for polyvinylidine fluoride. For instance, the fabrication of Teflon is difficult, while Viton and Kynar lose hydrogen fluoride readily at their decomposition temperatures. Viton and Kynar contain oxidizable hydrogens and though more easily fabricated exhibit less oxidative and thermal stability than Teflon.

In general, a significant factor limiting the utilization of much of the potential of highly fluorinated polymers is the solubility thereof in various liquids. Soluble polymers are highly desirable because the capability of solution assists in application and fabrication steps. In this regard, it is noted that polytetrafluoroethylene, a well known commercial polymer, is insoluble in all solvents at temperatures below 300° C. Other prior art highly fluorinated polymers, including 3,3,3-trifluoropropene and copolymers thereof with tetrafluoroethylene, are generally soluble in perfluoroaromatics, such as hexafluorobenzene, but insoluble in perfluoroalkanes, such as perfluorohexane, and perfluoroethers, e.g., FC-75 (a mixture of perfluoroethers produced by 3M Company). It is also noteworthy from an examination of the polymer structures in the light of their solubility in various liquids that the prior art is completely lacking in any reference to highly fluorinated polymers with partial or complete hydrocarbon backbones which are characterized by solubility in perfluoroalkanes or perfluoroethers. Thus, Viton, a commercial copolymer of perfluoropropene and vinylidene fluoride as aforementioned, is insoluble in either perfluorohexane or FC-75.

SUMMARY OF THE INVENTION

The invention relates to polymers based on hydrovinyl perfluoroalkyl monomers and characterized by recurring

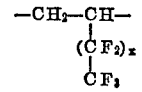

links in the polymer chain wherein $x$ is 1 or 2, said polymers being characterized by solubility in perfluoroalkanes and perfluoroethers and improved oxidative and thermal stability.

The invention relates more particularly to such polymers selected from the group consisting of homopolymers of the monomers 4,4,4,3,3-pentafluorobutene-1 and 5,5,5,4,4,3,3-heptafluoropentene-1 and copolymers of tetrafluoroethylene with monomers of the group consisting of 4,4,4,3,3-pentafluorobutene-1 and 5,5,5,4,4,3,3-heptafluoropentene-1.

The invention is based in part on the discovery that two $CF_2$ groups in the perfluoro side chain bring about solubility in perfluoroalkanes and perfluoroethers, whereas an equal or greater number in the backbone do not.

The invention is also based in part on the concept that the solubility found connotes that a large perfluoro branch protects or shields the backbone from the solvent environment and that this protective effect extends to other environmental agents, in particular those likely to cause degradation or deterioration of the material, such as oxygen, free radicals, fluorine, or other active reagents.

DESCRIPTION OF THE DRAWING

The drawing shows the thermogravimetric analyses of copolymers of tetrafluoroethylene and 3,3,4,4,5,5,5-heptafluoropentene-1, 1.5° C./min. The number on each curve indicates use of polymer formed in the experiments of the same number in Table I. Curve 3 on left is for a polymer sample that had received 29 mr. in vacuum before pyrolysis.

DETAILED DESCRIPTION OF THE INVENTION

In the course of the investigation leading to the present invention, various fluorinated monomers were subjected to drying and degassing treatments and then charged into high pressure bombs. Amounts charged in each run were calculated from monometric measurements by use of the perfect gas laws. Polymerization was carried out at high pressure using radiation from an external cobalt 60 source.

Results of polymerizations at 2000 rad/hr. are listed in Table I. Included are the pressure, initial and final mole fractions of $C_2F_4$ (tetrafluoroethylene) in the polymer, the mole percent of monomer polymerized, $R_p$—the first order polymerization rate constant $R_pR_B$—the copolymerization rate relative to the homopolymerization rate of $C_5F_7H_3$ (3,3,4,4,5,5,5-heptafluoropentene-1) under the same conditions and $[\eta]$—the intrinsic viscosity of the polymer in hexafluorobenzene in dl./g. (deciliters/gram).

TABLE I.—COPOLYMERIZATION OF TETRSFLUOROETHYLENE AND 3,3,4,4,5,5,5-HEPTAFLUOROPENTENE-1

(2,000 rad/hr. 22° C. except as indicated)

| Example | Pressure, atm. | Mole fraction $C_2F_4$ | | | Time, hr. | Polymer, mole percent | $R_p$, percent/hr. | $R_D/R_B$ | $[\eta]$, dl./g. |
|---|---|---|---|---|---|---|---|---|---|
| | | Initial | Final | Polymer | | | | | |
| 1 | 5,000 | 0.97 | 0.97 | ¹ 0.89 | 2.0 | 2.5 | 1.25 | 30.5 | Insol |
| 2 | 5,000 | 0.94 | 0.94 | ¹ 0.79 | 7.0 | 2.24 | 0.32 | 7.8 | 1.0 |
| 3 | 5,000 | 0.93 | 0.95 | ¹ 0.79 | 23.2 | 10.8 | 0.49 | 11.9 | 0.97 |
| 4 | 5,000-1 | 0.94 | | | 0.94 | 46.2 | 100 | >4.5 | >100 | Insol |
| 5 | 5,000 | 0.53 | 0.53 | 0.35 | 27 | 1.65 | 0.061 | 1.49 | 0.12 |
| 6 | 5,000 | 0.43 | 0.44 | 0.26 | 89 | 5.6 | 0.064 | 1.56 | 0.11 |
| 7 | 5,000 | 0.21 | 0.22 | 0.08 | 141 | 6.6 | 0.048 | 1.17 | 0.07 |
| 8 | 5,000 | 0 | 0 | 0 | 282 | 10.9 | 0.041 | 1 | 0.10 |
| 9 | 10,000 | 0.90 | 0.93 | 0.75 | 9.3 | 15.2 | 1.78 | 4.8 | 1.62 |
| 10 | 10,000 | 0.77 | 0.77 | 0.48 | 3.4 | 1.44 | 0.42 | 1.1 | 0.56 |
| 11 | 10,000 | 0.65 | 0.69 | ¹ 0.35 | 17.7 | 12.0 | 0.72 | 1.9 | 0.74 |
| 12 | 10,000 | 0.54 | 0.57 | 0.31 | 12.5 | 11.7 | 0.99 | 2.6 | 0.39 |
| 13 | 10,000 | 0 | 0 | 0 | 24 | 8.63 | 0.38 | 1 | 0.32 |
| 14 | 10,000 | 0 | 0 | 0 | 48 | 16.3 | 0.37 | 1 | 0.33 |
| 15 | 14,200 | 0.41 | 0.44 | ¹ 0.17 | 0.5 | 10.1 | 21.3 | 19.2 | 0.51 |
| 16 | 14,200 | 0.24 | 0.29 | 0.05 | 2.4 | 19.2 | 8.8 | 7.9 | 0.30 |
| 17 | 14,200 | 0 | 0 | 0 | 5.25 | 5.7 | 1.11 | 1 | 0.42 |
| 18² | 5,000 | 0.53 | 0.39 | 0.35 | 5.25 | ³ 8.6 | −1.8 | 4 | 0.13 |
| 19² | 5,000 | 0 | 0 | 0 | 21.0 | 9.1 | 0.45 | 1 | 0.03 |

¹ By elemental analyses.
² 1,000° C.
³ About 10% of charge went to non-polymeric products.

TABLE II.—THERMAL POLYMERIZATION OF TETRAFLUOROETHYLENE AND 3,3,4,4,5,5,5-HEPTAFLUOROPENTENE-1

(22° C. except as noted)

| Example: | Pressure, atm. | $C_2F_4$ charged, mole fraction | Time, hr. | Polymer, mole percent | $R_p$, percent/hr. | $[\eta]$, dl./g. |
|---|---|---|---|---|---|---|
| 20 | 10,000 | 0 | 18 | 0 | 0 | |
| 21 | 10,000 | 0.91 | 16 | 1.6 | 0.10 | 3.20 |
| 22 | 15,500 | 0 | 18 | 0 | 0 | |
| 23 | 15,500 | 0.26 | 2 | 16.5 | 9.0 | 1.13 |
| 24 ¹ | 5,000 | 0.72 | 3.3 | ² 2.4 | 0.9 | 0.39 |

¹ 100° C.
² About 30% of charge went to non-polymeric products.

The data in Table II indicate that at 22% C. thermal rates are much smaller than those at 2000 rad/hr. except at pressures well above 10,000 atm. when $C_2F_4$ is present. At 100° C. and 5000 atm. a relatively small thermal polymerization rate was obtained when 72% $C_2F_4$ was present. The yield of non-polymeric products in Ex. 24 much exceeded that of the polymer. One product, also found in Ex. 18, is perfluorocyclobutane. Two others were detected by chromatographic analysis but not identified. Their volatility suggests they may be cross dimers of $C_2F_4$ and $C_5F_7H_3$.

Copolymers of $C_2F_4$ and $C_5F_7H_3$ were found to be dissolved on opening the pressure vessels at −80° C. if the initial $C_2F_4$ content was 0.77 or less. In the other runs the fraction of polymer in solution decreased as the initial content of $C_2F_4$ increased.

Polymers from all Examples except 1 and 4 are soluble in hexafluorobenzene, FC-75, and perfluorohexane at room temperature. In hexafluorobenzene, Ex. 1 swelled to about three times its dry volume. Ex. 4 swelled very slightly.

The solubility of the homopolymer of $C_5F_7H_3$ in non-aromatic perfluoro-solvents is surprising when one considers that it has a hydrocarbon backbone. Intrinsic viscosities of one sample in FC-75 and hexafluorobenzene were the same, 0.42 dl./g. indicating no great difference in the dimensions of the polymer molecule in the two solvents. In contrast, neither the polymer of $C_3F_3H_3$ (3,3,3-trifluoropropene) nor its amorphous copolymers with $C_2F_4$ are soluble in FC₄75 or perfluorohexane although they dissolve readily in hexafluorobenzene.

Thermogravimetric analyses were performed in vacuo for the purpose of evaluating the stability of a number of the polymers listed in Table I. The results there are curvilinearly depicted in the drawing.

It will be noted therefrom that a progressive increase in stability develops as the fraction of $C_2F_4$ increases. In Ex. 14 the very high conversion in the polymerization presumably is associated with the decrease in slope at 30% weight loss. High polymerization temperature or prior exposure of the polymer to gamma radiation appears to lower the thermal stability. Reference curves are shown for polytetrafluoroethylene and Viton, the commercial copolymer of vinylidene fluoride and tetrafluoroethylene.

The stability of $C_2F_4/C_3F_3H_3$ and $C_2F_4/C_5F_7H_3$ copolymers having the same content of $C_2F_4$ is about the same.

Polymers of several compositions were irradiated in vacuum and immersed in hexafluorobenzene. If completely soluble their intrinsic viscosities were determined otherwise their gel fractions were measured. Results are provided in Table III.

TABLE III.—EFFECT OF GAMMA RADIATION IN VACUUM ON COPOLYMERS OF TETRAFLUOROETHYLENE AND 3,3,4,4,5,5,5-HEPTAFLUOROPENTENE-1

(45° C., dose rate=3.6 Mrad/hr. except as noted)

| $F_A$, mole fraction | Dose, Mrad | $[\eta]$, dl./g. | | $W_g$, gel fraction |
|---|---|---|---|---|
| | | Before | After | |
| 0 | 7.2 | 0.49 | 0.15 | 0 |
| 0 | 26 | 0.49 | 0.07 | 0 |
| 0 | 44 | 0.49 | 0.06 | 0 |
| 0 | ¹ 24 | 0.49 | 0.06 | 0 |
| 0.35 | 26 | 0.50 | 0.12 | 0 |
| 0.51 | 26 | 0.39 | 0.15 | 0 |
| 0.75 | 26 | 1.62 | Gel | 0.80 |
| 0.79 | 7.2 | 0.97 | Gel | ² 0.80 |
| 0.79 | 26 | 0.97 | Gel | ² 0.88 |
| 0.79 | 44 | 0.97 | Gel | ² 0.90 |

¹ Irradiated at 3.2 Mrad/hr., 70° C.
² The ratio of scissions to crosslinked units is estimated to be 0.4 from the variation in gel content with dose.

The homopolymers dissolved completely, whether irradiated above or below $T_g$, the glass transition temperature. They also became extremely weak. The copolymers were at or above $T_g$ when irradiated. Those having $C_2F_4$ contents of 75% or more gelled on exposure to gamma radiation. Those containing 51% or less $C_2F_4$ remained soluble.

Acrid gases were present when the tubes of homopolymer were opened, indicating that hydrogen fluoride forms.

Such gases were less noticeable above the copolymers.

The homopolymer of $C_3F_3H_3$ and its copolymers with $C_2F_4$ crosslinked when irradiated.

In addition to the aforementioned thermogravimertic studies to show polymer stability in vacuo, it was desired to demonstrate polymer stability in air.

This and the correlation that exists between solubility in perfluoroalkanes and resistance to oxygen at elevated temperatures are shown by the intrinsic viscosities of samples after aging in air and in vacuum at high temperature. Intrinsic viscosity is a sensitive function of molecular weight degradation of a polymer is generally accompanied by a decrease in the intrinsic viscosity. Results are shown in Table IV.

TABLE IV.—INTRINSIC VISCOSITIES OF FLUORINE CONTAINING POLYMERS AFTER AGING AT HIGH TEMPERATURE
(values in dl./g. in hexafluorobenzene at 29.7° C.)

| Aging conditions (film 0.3 mm. thick) | $CF_3$ $\|$ —$CH_2CH$— | $CF_3$ $\|$ $CH_2CH$— $C_2F_4$ (1:2.3) | n$C_3F_7$ $\|$ n$C_3F_7$ —$CH_2CH$— | n$C_3F_7$ $\|$ $CH_2CH$— $C_2F_4$ (1:3) |
|---|---|---|---|---|
| Hot aged | 2.63 | 2.18 | 0.45 | 1.65 |
| 225° C. no air, 87 hrs | 2.55 | 2.23 | 0.44 | 1.68 |
| 225° C., air, 24 hrs | 0.08 | 2.18 | 0.43 | 1.65 |
| 305° C., no air, 87 hrs | 0.89 | 1.71 | 0.04 | 1.30 |
| 305° C., air, 52 hrs | 0 | 0.70 | 0 | 0.94 |

In the absence of air at 225° all polymers listed in Table IV appear stable. In air at 225° C. a poly-3,3,3-trifluoropropene, which is insoluble in perfluorohexane, degraded greatly, but poly-3,3,4,4,5,5,5-heptafluoropentene-1, which is soluble in perfluorohexane, degraded hardly at all. At 225° C. both copolymers containing tetrafluoroethylene are stable, demonstrating the advantage of its presence. At 305° C. all polymers degrade whether in air or not. In the absence of air degradation is most severe for the polypentene, indicating that it is basically less stable than the polypropene in air, degradation of both is very severe and results are inconclusive. Degradation of the copolymers is less severe than that of homopolymers, again demonstrating the benefit of having tetrafluoroethylene present. Without air the copolymers degrade about equally but in air the pentene copolymer degrades less than the propene copolymer. The former is soluble in perfluorohexane but the latter is not.

Table V lists maximum tetrafluoroethylene content of copolymers which are soluble at 25° C. in hexafluorobenzene.

TABLE V

Maximum observed mol percent tetrafluoroethylene in soluble copolymers with listed comonomers (Soluble in $C_6F_6$ at 25° C.)

| Comonomer: | Mol percent $C_2F_4$ |
|---|---|
| $CH_2CHCF_3$ | 70 |
| $CH_2CFCF_3$ | 80 |
| $CH_2CHC_3F_7$ | 80 |
| $CH_2C(CF_3)_2$ | 90 |

One of the more interesting observations is the contrasting solubility behavior of amorphous $C_2F_4/C_5F_7H_3$ and $C_2F_4/C_3F_3H_3$ copolymers in fully fluorinated non-aromatic solvents. The copolymer of $C_2F_4$ and $C_3F_3H_3$ containing 70% $C_2F_4$ has more —$CF_2$— groups than the homopolymer of $C_5F_7H_3$. Yet, the former polymer is insoluble and the latter is soluble in these solvents. Thus a structure consisting of a hydrocarbon backbone with three carbon perfluoroalkyl side chains on alternate carbons is more compatible with fluorocarbon solvents than a structure containing many —$CF_2$— groups located in the backbone, and in which each —$CH_2CH$— unit of the backbone has only a perfluoromethyl branch.

A more comprehensive evaluation of solubility characteristics for a variety of homopolymers as well as copolymers was undertaken and the results thereof are reflected in Table VI.

TABLE VI.—SOLUBILITY AT 25° C. OF FLUORINE-CONTAINING POLYMERS

| Example | Polymer structure | Acetone | Benzene | Hexafluorobenzene | Perfluorohexane |
|---|---|---|---|---|---|
| A | —$CH_2CH$— $\|$ $CF_3$ | S | W | S | X |
| B | —$CH_2CH$— $\|$ $CF_2CF_3$ | X | X | S | S |
| C | —$CH_2CH$— $\|$ $CF_2CF_2CF_3$ | X | X | S | S |
| D | —$CF_2CF_2$— | X | X | X | X |
| E | ($CH_2CH$)—$CF_2CF_2)_2$ $\|$ $CF_3$ | X | X | S | X |
| F | ($CH_2CH$)—($CF_2CF_2)_4$ $\|$ $CCF_3$ $\|$ $CF_3$ $\|$ $CF_3$ | X | X | S | S |
| G | —$CF_2CF$— $\|$ $C_6F_5$ | X | X | S | X |
| H | Same as above | W | S | X | X |
| I | —$CH_2CH$— $\|$ $C_6F_5$ | S | X | S | X |
| J | Same as above | X | S | X | X |

NOTE.—S=soluble; X=insoluble; W=swollen.

It is observed in Table VI that poymers of 4,4,4,3,3-pentafluorobentene-1 (Ex. B) and 5,5,5,4,4,3,3-heptafluoropentene-1 (Ex. C) are soluble in perfluorohexane and FC-75 (a commercial mixture of perfluoroethers). Copolymers of the pentene containing as much as 80 mole percent tetrafluoroethylene (Ex. F) are also soluble in both of these solvents. On the other hand neither the polymer of 3,3,3-trifluoropropene (Ex. A) nor any of its copolymers (Ex. E) with tetrafluoroethylene is soluble in either of these solvents, although in general they are soluble in perfluoroaromatics.

Having thus described the invention so that others skilled in the art may be able to understand and practice the same, it is expressly understood that various changes may be made in the invention without departing from the spirit and scope of same.

We claim:
1. A copolymer of tetrafluoroethylene with 5,5,5,4,4,3,3-heptafluoropentene-1, which contains between about 8 and about 80 mole percent of tetrafluoroethylene and is characterized by solubility in hexafluorobenzene and perfluorohexane at 25° C.

References Cited
UNITED STATES PATENTS
2,549,580   4/1951   Denison et al. _____ 260—653

OTHER REFERENCES
American Chemical Society, Division of Polymor Chemistry, Preprints 6 (2), pp. 965–976 (1965).

STANFORD M. LEVIN, Primary Examiner

U.S. Cl. X.R.
260—33.8 F

UNITED STATES PATENT OFFICE
CERTIFICATE OF CORRECTION

Patent No. 3,804,817  Dated April 16, 1974

Inventor(s) Leo A. Wall and Daniel W. Brown

It is certified that error appears in the above-identified patent and that said Letters Patent are hereby corrected as shown below:

Column 2, line 68, "$R_p R_B$" should read --$R_p/R_B$--. Column 3, Table 1, footnote 2, "1000°C." should read --100°C.--; line 37, "22%C." should read --22°C.--. Column 5, line 12, "weight degradation" should read --weight. Degradation--; line 37, "polypropylene in air", should read --polypropylene. In air,--; Table IV, under Aging Conditions, "hot aged" should read --not aged--. Column 6, line 29, "fluoronated" should read --fluorinated--; Table VI, under Polymer structure: in example E, that portion of the formula reading -$CF_2CF_2)_2$ should read -$(CF_2CF_2)_2$; in example F, that portion of the formula reading $\overset{|}{\underset{|}{C}}CF_2$ should read $\overset{|}{\underset{|}{C}}F_2$; in example H, "same as above" should read -$\underset{\underset{C_6H_5}{|}}{C}F_2CF$-; and in example J, "same as above" should read -$\underset{\underset{C_6H_5}{|}}{C}H_2CH$-.

Signed and sealed this 7th day of January 1975.

(SEAL)
Attest:

McCOY M. GIBSON JR.  
Attesting Officer

C. MARSHALL DANN  
Commissioner of Patents